US00RE42057E

(19) United States
(12) Reissued Patent
Haupt et al.

(10) Patent Number: US RE42,057 E
(45) Date of Reissued Patent: Jan. 25, 2011

(54) WEATHER STATION

(75) Inventors: Rolf Wilhelm Haupt, Chalwan (HK); Fritz Schaffel, Eching (DE)

(73) Assignee: Richmond IP Holdings, Inc., Richmond, VA (US)

(21) Appl. No.: 11/485,648

(22) Filed: Jul. 13, 2006

Related U.S. Patent Documents

Reissue of:
(64) Patent No.: 6,761,065
Issued: Jul. 13, 2004
Appl. No.: 10/358,388
Filed: Feb. 5, 2003

(30) Foreign Application Priority Data

Feb. 21, 2002 (DE) ..... 102 07 423

(51) Int. Cl.
*G01W 1/00* (2006.01)
*G01P 13/00* (2006.01)

(52) U.S. Cl. ..... 73/170.16; 73/170.01; 73/170.02; 73/170.06

(58) Field of Classification Search ... 73/170.01–170.28
See application file for complete search history.

(56) References Cited

U.S. PATENT DOCUMENTS 4,891,642 A * 1/1990 Muller ..... 340/968
5,127,358 A * 7/1992 Galloway et al. ..... 116/265
5,355,724 A * 10/1994 Zysko ..... 73/170.06
5,448,161 A * 9/1995 Byerley et al. ..... 324/72
6,202,023 B1 3/2001 Hancock et al.
6,380,535 B1 * 4/2002 Wetzel et al. ..... 250/227.14
6,672,152 B2 * 1/2004 Rouse et al. ..... 73/170.02
6,679,112 B2 * 1/2004 Collot et al. ..... 73/170.04

FOREIGN PATENT DOCUMENTS

DE 3434437 A1 3/1986

* cited by examiner

*Primary Examiner*—Lisa M Caputo
*Assistant Examiner*—Jermaine Jenkins
(74) *Attorney, Agent, or Firm*—Banner & Witcoff, Ltd.

(57) ABSTRACT

A weather station with at least one element mounted on bearings on a housing or rack on a vertical axis for alignment with the direction of the wind and with a measuring device, which depending on the angle position of the element aligning in the direction of the wind provides an electrical signal, wherein the measuring device is an opto electric measuring device with at least two light paths. Each of the at least two light paths has its own light-emitting element and which have a common light detector and form a light path configuration, each light path is used to scan a group of markings, which are located around an axis of at least one screen in such a manner that the markings provide a code when scanning that defines the angle area of the position of the element aligning with the direction of the wind. The light-emitting elements determine the angle position of the element aligning with the direction of the wind.

45 Claims, 2 Drawing Sheets

WEATHER STATION

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,761,065. The reissue applications are application Ser. Nos. 11/485,648 (the present application filed Jul. 13, 2006) and 12/339,642 (filed Dec. 19, 2008) which is a continuation reissue of U.S. Pat. No. 6,761,065.*

BACKGROUND OF THE INVENTION

The invention relates to a weather station, in particular, to a weather station that is also suitable for private use. The station has at least one element mounted on bearings on a housing, or rack, on a vertical axis for alignment with the direction of the wind and with a measuring device, which depending on the angle position of the element aligning in the direction of the wind, provides an electrical signal.

Weather stations, especially for private use, are known. In particular, such weather stations are also known that can be used to measure wind direction and wind force, whereby the wind direction is measured by means of a wind vane, the angle position of which is converted to an electric signal, by means of a potentiometer, the slider of which is connected with the wind vane as a driving mechanism.

The signal corresponding to the wind direction and the signal corresponding to the wind force derived from a wind wheel, or impeller wheel, is input to an electronic analysis and control unit, which then sends digital data corresponding to these signals by means of a transmitter of the electronic analysis and control unit to a spatially distant display station.

The object of the present invention is to improve a weather station to the effect of achieving a simplified design, in particular, of the measuring device for generating the signal corresponding to the wind direction with improved sensitivity.

SUMMARY OF THE INVENTION

In order to achieve this object, a weather station with at least one element mounted on bearings on a housing or rack on a vertical axis for alignment with the direction of the wind and with a measuring device, which depending on the angle position of the element aligning in the direction of the wind provides an electrical signal, wherein the measuring device is an opto electric measuring device with at least two light paths. Each of the at least two light paths has its own light-emitting element and which have a common light detector and form a light path configuration, each light path is used to scan a group of markings, which are located around an axis of at least one screen in such a manner that the markings provide a code when scanning that defines the angle area of the position of the element aligning with the direction of the wind. The at least one screen and the light path configuration corresponding to the position of the element aligning with the direction of the wind can be swivelled relative to each other around the axis of the screen, and an electronic control and analysis unit is provided that individually activates the light-emitting elements during a measuring or analysis phase and hereby determines the angle position of the element aligning with the direction of the wind.

In the invention, the wind is measured in angle steps or in angle areas, for example in a total of 16 angle areas with the use of a total of four groups of optically scannable markings and accordingly of four light paths, each of which scans the markings of one group. The wind direction is measured in this process fully without contact, so that an accurate display is possible even at low wind forces.

A further special feature of the invention is that the light paths, of which at least one is allocated to one group of optically scannable markings, each has its own light-emitting elements, which can economically be realized in the form of light-emitting diodes, but only one common light detector or receiver for all light paths. The single groups of markings are then scanned successively in time by corresponding activation of its allocated light-emitting element and/or the scanning of the individual groups takes place by pulsed activation of the allocated light-emitting element each with a different pulse frequency, so that the presence of a marking of a particular group can be determined based on the frequency of the received light signal or conversely that the absence of a marking of a particular group can be determined based on the absence of a particular frequency in the received light signal. Also by triggering the light-emitting elements of the various light paths with different pulse frequencies these elements can be activated preferably for a limited time and/or successively in time.

BRIEF DESCRIPTION OF THE DRAWINGS

The invention is described in more detail below based on embodiments as depicted in the drawings.

DETAILED DESCRIPTION OF THE INVENTION

Figure 1:
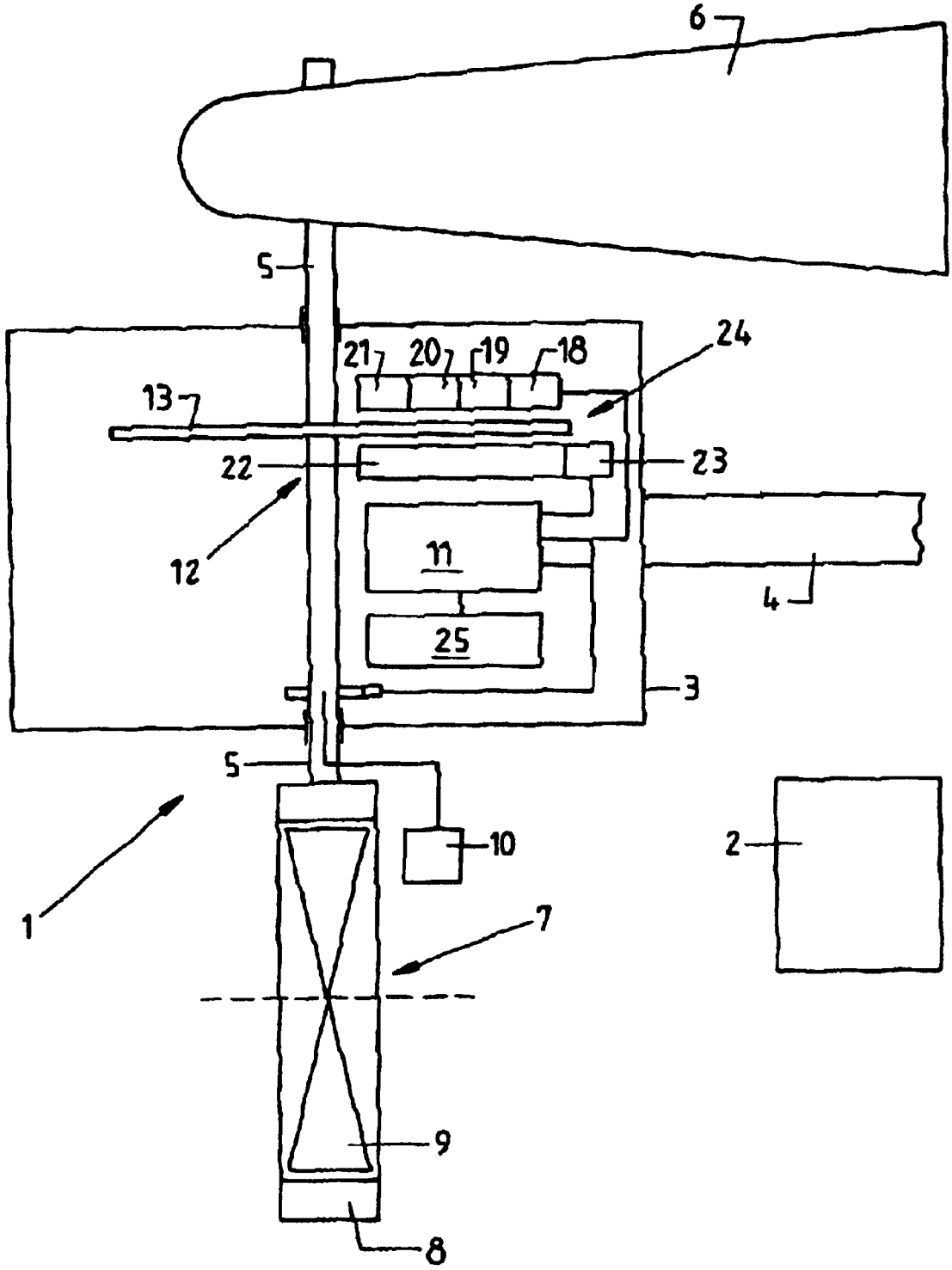
FIG. 1 shows a simplified representation in cross section of a weather station according to the present invention.
Figure 2:
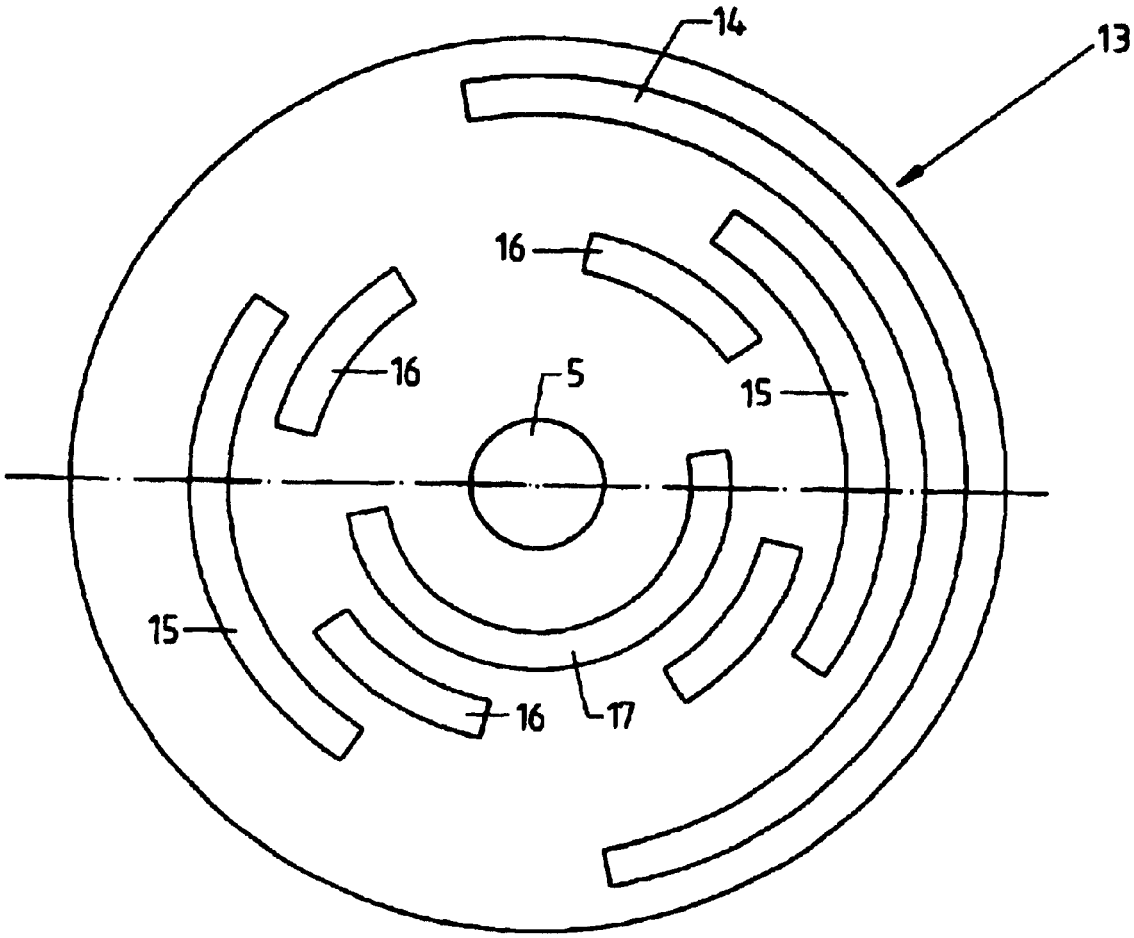
FIG. 2 shows a slice of an angle transmitter of the weather station in FIG. 1.

The weather station generally designated 1 in the drawings, which is suitable especially for private use, makes it possible to measure the wind speed and the wind direction and transfers the measured data by means of a radio signal to a spatially separate display device 2. The weather station 1 for this purpose consists essentially of a closed housing 3, which can be fastened to the facade of a building or a wall or another suitable base by means of an arm 4 that extends radially from the housing.

In the housing 3 there is a shaft 4 mounted on bearings on a vertical axis. An upper end of the shaft 4 extends beyond the top of the housing and a lower end of the shaft extends beyond the bottom of the housing 3. A wind vane 6 is fastened to the top end of the shaft 5 and a device 7 for measuring the wind force is fastened to the lower end of the shaft. The wind vane 6 is designed so that it aligns with the direction of the wind with the rotation of the shaft 5, hereby aligning the device 7 in such a manner that it is positioned ideally to the wind direction.

The device 7 includes an outer frame 8 designed as a ring, in which a small impeller wheel 9 can rotate freely on bearings on an axis radial to the axis of the shaft 5. The impeller wheel 9, which is designed in the manner of an airplane propeller with slanted blades, is provided with a permanent magnet that works together with a sensor 10 that activates a magnetic field, for example with a reed contact, in such a manner that this sensor 10 provides a pulse sequence proportionate to the number of revolutions. The signal provided by the sensor 10 is therefore proportional to the wind force. The sensor 10 is for example integrated in a spoke-like brace of the frame 8, on which the impeller wheel 9 can also rotate freely on bearings. The signal of the sensor 10 is transferred by means of a sliding contact 11 to an electronic analysis and control unit 11 accommodated in the housing 3, for example operated by battery and containing a microprocessor. The device 7 described here offers the advantage that the forces that act on the impeller wheel 9 are very small, that an inexpensive sliding bearing can be used for the bearings of the impeller wheel 9 and with low friction, so that even at low wind speeds, for example wind speeds as low as 0.5 m/sec, a display is possible.

To measure the wind direction the housing also contains an angle transmitter or a measuring device 12, which has, inter alia, a screen or orifice plate 13 that is on the same axis as the shaft and is connected with the shaft so that it turns with the shaft. In this plate 13 on several, i.e. in the depicted embodiment distributed on four imaginary concentric circles on the middle axis of the orifice plate 13, there are optically scannable markings in the form of slit-shaped openings, on the outermost imaginary circle one circular arc opening extending over an angle area of 180°, on the adjacent, further inward imaginary circle two circular arc openings 15 offset in relation to each other by 180° each of which extends over an angle area of 90°, on the adjacent, further inward imaginary circle four circular arc openings 16 offset in relation to each other by 90°, which extend over an angle area of 45°, and on the innermost imaginary circle a slit-shaped opening 17, that also extends over an angle area of 180°. The circular arc slits or openings 14–17 therefore form four groups of optically scannable markings and are offset from group to group such that sixteen angle areas of 22.5° each are distributed on the axis of the orifice plate 13 and are uniquely defined by the fact that each angle area has an opening with a typical pattern formed by the openings 14–17 that differs from the other angle areas.

Since the openings 14–17 form groups with a different radial distance from the axis of the orifice plate 13, this results in a total of sixteen uniquely defined angle areas, of which one is designated WB in the drawing. A different number of groups, e.g. a total of five groups, results in 32 different, uniquely defined angle areas.

Furthermore, the measuring device 12 has four light diodes 18–21, which are located on one side of the orifice plate 13, in the depicted embodiment above the orifice plate 13, in a stationary manner, i.e. not rotating with the orifice plate, in a row extending radially to the orifice plate, in such a manner that each light diode 18–21 is allocated to a group of openings 14–17, i.e. is located on the movement path of the corresponding group of openings. On the other side of the orifice plate 13 there is a light guide 22, which is optically connected with a light detector 23 and by means of which the light of the light diodes 18–21 is transferred to the light sensor 23, which for example consists of a phototransistor. The light diodes 18–21 therefore form four light paths for scanning the openings 14–17 with the common light sensor 23. The latter provides a sensor signal to the electronic analysis and control unit 11 dependent on the presence or absence of a light signal striking the light sensor.

To determine the respective angle position or the respective angle area of the current wind direction the light diodes 18–21 are activated periodically in time intervals, in such a manner that in a measuring cycle there the light diodes 18–21 are activated alternately in time for a limited time at least once during each time interval, so that during this measuring cycle the groups of openings are scanned serially for the presence or absence of an opening, from which the respective angle area of the wind direction is determined.

The light barrier unit 24 with the alternately activated light diodes 18–21 and the common light sensor represents a particularly reliable, but also economical solution for the measuring device 12. A further advantage of this measuring device 12 is that it enables the contactless and zero force or zero moment determination of the angle position. This also contributes to the fact that even very low wind speeds, for example as low as 0.5 m/sec, can be displayed.

The data measured by the electronic analysis and control unit 11 (wind speed and wind direction) is fed to a transmitter module 25, which is also accommodated in the housing 3, for transfer to the display 2.

Generally it is also possible to activate each of the individual diodes 18–21 with a different pulsed frequency, likewise preferably successively in time, so that due to the different frequency of the signal supplied by the light detector 23, this signal can be allocated to the respective light diode 18–21 or to the respective group of openings, therefore making it possible to determine the presence or absence of an opening in the groups of openings of the angle areas.

The invention was described above based on sample embodiments. Of course, numerous modifications and variations are possible without abandoning the underlying inventive idea upon which the invention is based.

REFERENCE NUMBERS

1 weather station
2 display device
3 housing
4 fastening arm
5 shaft
6 weather vane
7 device for measuring wind speed
8 frame
9 impeller wheel
10 sensor
11 electronic analysis and control unit
12 angle measuring device
13 screen or orifice plate
14–17 circular arc slit
18–21 light-emitting element, for example light-emitting diode
22 light guide
23 light sensor
24 light barrier unit
25 transmitter module

What is claimed is:

1. A weather station with at least one element mounted on bearings on a housing or rack on a vertical axis for alignment with the direction of the wind and with a measuring device, which depending on the angle position of the element aligning in the direction of the wind provides an electrical signal, wherein the measuring device comprising an opto electric measuring device with at least two light paths, each of which has its own light-emitting element and which have a common light detector and form a light path configuration, each light path is used to scan a group of markings, which are located around an axis of at least one screen in such a manner that the markings provide a code when scanning that defines the angle area of the position of the element aligning with the direction of the wind, the at least one screen and the light path configuration corresponding to the position of the element aligning with the direction of the wind can be swivelled relative to each other around the axis of the screen, and an electronic control and analysis unit is provided that individually activates the light-emitting elements during a measuring or analysis phase and hereby determines the angle position of the element aligning with the direction of the wind.

2. The weather station as claimed in claim 1, wherein the markings are openings or slits in the screen.

3. The weather station as claimed in claim 1, wherein the screen is an orifice plate.

4. The weather station as claimed in claim 1, wherein the light-emitting elements are light-emitting diodes.

5. The weather station as claimed in claim 1, wherein the light sensor is a photo diode or a photo transistor.

6. The weather station as claimed in claim 1, wherein the element aligning with the direction of the wind is a wind vane.

7. The weather station as claimed in claim 1, wherein the element aligning with the direction of the wind is fastened to a shaft, which is mounted on bearings in the housing or rack and on which the at least one screen is located.

8. The weather station as claimed in claim 1, wherein the electronic analysis and control unit activates the light-emitting elements at predetermined time intervals, at least once in each time interval during a measuring phase.

9. The weather station as claimed in claim 1, wherein the electronic analysis and control unit activates the light-emitting elements non-simultaneously during the measuring phase.

10. The weather station as claimed in claim 1, wherein the light-emitting elements are activated during each measuring phase at least once with a different frequency.

11. The weather station as claimed in claim 1, wherein when the screen is a disc or plate with several groups of optically scannable markings located on concentric circles on the axis of the disc or plate, the light-emitting elements are arranged in sequence radially to the axis of the plate.

12. The weather station as claimed in claim 1, wherein when the screen is a cylinder with several groups of optically scannable markings that are offset in relation to each other in the direction of the cylinder axis, the light-emitting elements are offset in relation to each other axially to the axis of the screen.

13. The weather station as claimed in claim 1, wherein the light sensor is located on a light guide, which forms several light inlet areas, of which at least one is allocated to each light-emitting element.

14. The weather station as claimed in claim 13, wherein the light guide or the light inlet areas of this light guide are located on a line parallel to the arrangement of the light-emitting elements.

15. The weather station as claimed in claim 1, wherein a device for measuring the wind force with a wind wheel driven in a rotary manner by the wind that works together with a sensor for generating an electric signal corresponding to the wind force, whereby the wind wheel is a freely revolving impeller wheel.

16. The weather station as claimed in claim 15, wherein the at least one sensor for generating the signal corresponding to the wind force is an inductive sensor.

*17. An apparatus comprising:*

*at least one light emitting element configured to scan a group of markings located about an axis of at least one circular screen to determine the angular position of an element aligning with a wind direction; wherein the screen comprises four groups of optically scannable markings each group located on a different concentric circle on the axis of the screen.*

*18. The apparatus of claim 17 wherein the markings are openings in the screen; and each group comprises one or more openings.*

*19. The apparatus of claim 17 wherein the openings are slits.*

*20. The apparatus of claim 17 wherein the screen is an orifice plate.*

*21. The apparatus of claim 17 wherein the at least one light-emitting element is at least one light-emitting diode.*

*22. The apparatus of claim 17 further comprising a light sensor.*

*23. The apparatus of claim 17 wherein the light sensor is a photo diode or a photo transistor.*

*24. The apparatus of claim 17 wherein the element aligning with the direction of the wind is a wind vane.*

*25. A device for measuring the direction of the wind comprising:*

*a light path configuration comprising at least one light emitting element configured to scan a group of markings located around an axis of at least one circular screen; wherein the screen contains four groups of optically scannable markings, each group located on a different concentric circle on the axis of the screen; wherein when scanned, the markings provide a code defining an angle area of the position of an element aligning with the direction of the wind.*

*26. The device as claimed in claim 25 wherein the markings are openings in the screen; and each group comprises one or more openings.*

*27. The device as claimed in claim 26 wherein the openings are slits.*

*28. The device as claimed in claim 25 wherein the screen is an orifice plate.*

*29. The device as claimed in claim 25 wherein the at least one light-emitting element is at least one light-emitting diode.*

*30. The device as claimed in claim 25 comprising at least two light-emitting elements.*

*31. The device as claimed in claim 25 further comprising a light sensor.*

*32. The device as claimed in claim 25 wherein the light sensor is a photo diode or a photo transistor.*

*33. The device as claimed in claim 25 wherein the element aligning with the direction of the wind is a wind vane.*

*34. The device as claimed in claim 25 wherein the screen is a disc or plate.*

*35. The device as claimed in claim 34 further comprising at least two of light-emitting elements arranged in sequence radially to the axis of the plate.*

*36. The device as claimed in claim 25 wherein the screen is a cylinder with several groups of optically scannable markings that are offset in relation to each other in the direction of the cylinder axis.*

*37. The device as claimed in claim 36 further comprising at least two of the light-emitting elements are offset in relation to each other axially to the axis of the screen.*

*38. An apparatus comprising*

*a shaft;*

*a circular screen disposed about an axis of the shaft and connected with the shaft, wherein the screen is a disc or plate having four groups of optically scannable markings, each group located on a different concentric circle on the axis of the disc or plate, wherein the screen rotates with the shaft,*

*at least one light-emitting element located in a stationary manner adjacent the screen; and*

*a light detector for detecting a code that defines the position of the element aligning with the direction of the wind.*

*39. The apparatus of claim 38 wherein the circular screen is an orifice plate.*

*40. A measuring device for measuring the direction of the wind comprising*

*an element for aligning with the wind comprising a shaft;*

*an angle transmitter comprising an orifice plate on the same axis as the shaft and connected with the shaft, wherein the plate rotates with the shaft;*

*the orifice plate comprising four groups of openings that are distributed on four concentric circles from the middle axis of the orifice plate, the openings being offset from each other; and*

*the orifice plate being radially divided into angle segments wherein each angle segment has a unique area defined by the openings.*

*41. The device of claim 40 further comprising at least one light-emitting element located in a stationary manner adjacent the orifice plate and together with the openings form light paths; and*

*the light paths providing a code that defines the position of the element aligning with the direction of the wind.*

*42. The device of claim 40 wherein the orifice plate is radially divided into sixteen uniquely defined angle areas.*

*43. The device of claim 40 comprising slit-shaped openings distributed on the four circles.*

*44. The device of claim 43 wherein on an outermost circle, one circular arc opening extends over an angle area of 180°, on the adjacent, further inward circle, two circular arc openings are offset in relation to each other by 180° each of which extends over an angle area of 90°, on the adjacent, further inward circle four circular arc openings 16 offset in relation to each other by 90° each of which extend over an angle area of 45°, and on the innermost circle a slit-shaped opening extends over an angle area of 180°.*

*45. A method of detecting the position of an element aligning with the direction of the wind comprising:*

*rotating both a shaft connected to the element aligning with the direction of the wind and an orifice plate disposed about an axis of the shaft; wherein the orifice plate contains four groups of optically scannable markings, each group located on a different concentric circle on the axis of the plate;*

*scanning the orifice plate with at least one light-emitting element located in a stationary manner adjacent the orifice plate; and*

*detecting a code that defines the position of the element aligning with the direction of the wind.*

* * * * *